United States Patent
Mann

(10) Patent No.: US 7,261,798 B2
(45) Date of Patent: Aug. 28, 2007

(54) ASSEMBLY FOR MAINTAINING COMPRESSION FOR ELECTRICAL CONTACT OF THE ACTIVE AREA OF AN ELECTROCHEMICAL CELL

(75) Inventor: John Calvin Mann, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 521 days.

(21) Appl. No.: 10/766,066

(22) Filed: Jan. 28, 2004

(65) Prior Publication Data

US 2005/0164068 A1    Jul. 28, 2005

(51) Int. Cl.
*C25B 9/00* (2006.01)
*H01M 2/08* (2006.01)
*H01M 4/00* (2006.01)

(52) U.S. Cl. .................. 204/242; 204/267; 204/283; 429/37; 429/66

(58) Field of Classification Search ................ 204/242, 204/267, 283; 429/37, 66
See application file for complete search history.

(56) References Cited

U.S. PATENT DOCUMENTS

| | | | |
|---|---|---|---|
| 4,792,388 A * | 12/1988 | de Nora | 205/525 |
| 5,316,644 A | 5/1994 | Titterington et al. | |
| 5,324,565 A | 6/1994 | Leonida et al. | |
| 5,366,823 A | 11/1994 | Leonida et al. | |
| 5,466,354 A | 11/1995 | Leonida et al. | |
| 5,716,503 A | 2/1998 | Dean et al. | |
| 6,037,075 A | 3/2000 | Critz et al. | |
| 6,096,449 A * | 8/2000 | Fuglevand et al. | 429/13 |
| 6,171,719 B1 | 1/2001 | Roy et al. | |
| 2002/0022173 A1 * | 2/2002 | Molter et al. | 429/37 |

* cited by examiner

*Primary Examiner*—Roy King
*Assistant Examiner*—Nicholas A. Smith
(74) *Attorney, Agent, or Firm*—Carlson, Gaskey & Olds, PC

(57) ABSTRACT

An electrochemical cell structure has a first fluid chamber and a resilient member disposed in the first fluid chamber. An opening permits communication of fluid into the first fluid chamber. An anode cavity and a cathode cavity are in fluid communication with the fluid chamber through the opening.

13 Claims, 4 Drawing Sheets

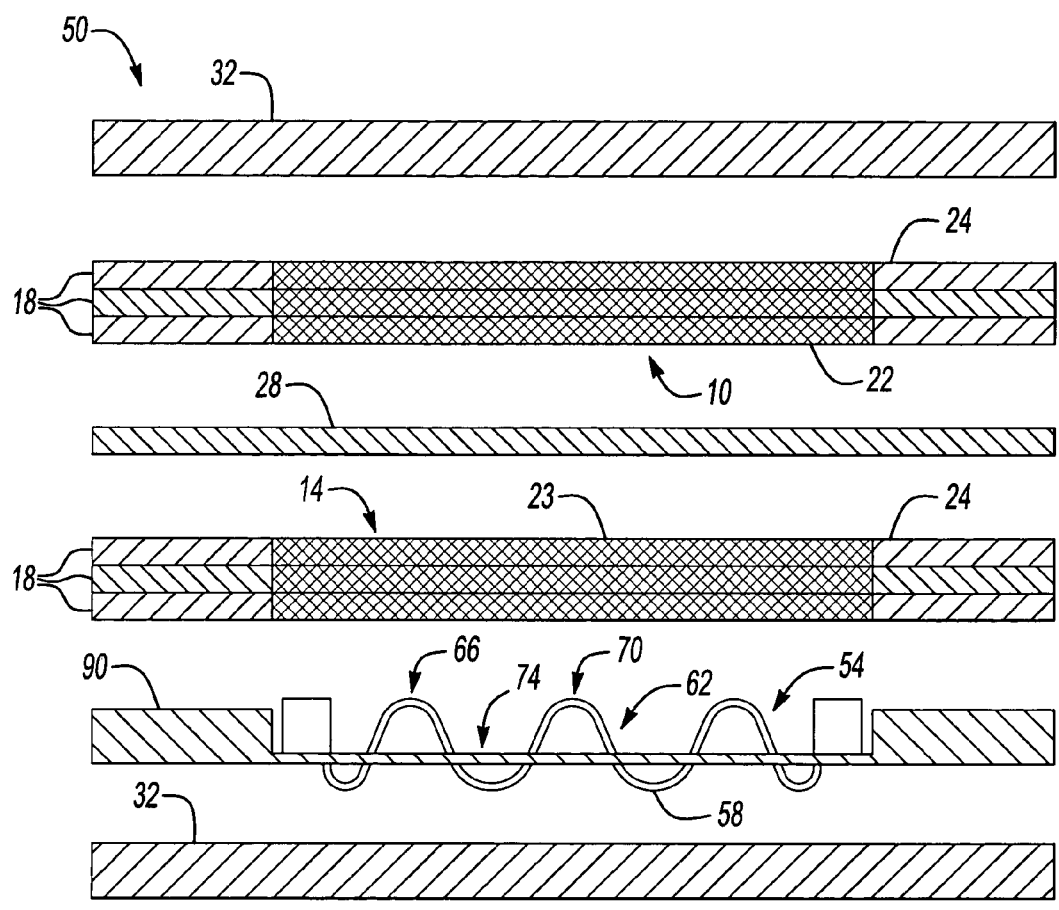
Fig-2

ASSEMBLY FOR MAINTAINING COMPRESSION FOR ELECTRICAL CONTACT OF THE ACTIVE AREA OF AN ELECTROCHEMICAL CELL

BACKGROUND OF THE INVENTION

This invention relates to a cell structure for an electrochemical cell.

An electrochemical cell may be used to electrolytically separate water into its components, hydrogen and oxygen or, alternatively, combine hydrogen with oxygen to generate electricity. Each electrochemical cell typically has an anode cavity, a cathode cavity and an electrolyte. The electrolyte may be an ionically conductive material, such as an ion-exchange membrane or liquid contained in a porous matrix. The electrolyte is positioned between the anode cavity and the cathode cavity and serves to control the exchange of electrical charge and fluid between the two cavities.

FIG. 1 illustrates an exploded view of an electrochemical cell 12 known in the art. As shown, electrochemical cell 12 has anode cavity 10 and cathode cavity 14 arranged between separator plates 32. Each cavity 10, 14 comprises a series of electrically conductive round metal plates 18, which are stacked upon one another to form a cylinder. Each plate 18 may have a central area or active area 22 comprising a mesh screen filled with openings that permit the passage of fluid through each plate 18. A peripheral area or a seal area 24 surrounds the mesh screen to form a seal that prevents the leakage of fluid out of the active area 22. When all of the active areas 22, 23 of each the plates 18 are aligned, the stack of mesh screens form a fluid cavity, both an anode cavity and a cathode cavity.

Anode cavity 10 is spaced from cathode cavity 14. Together, these cavities 10, 14 sandwich electrochemically conductive medium 28, here an ion-exchange membrane. It is through this membrane that fluid and charge are communicated for either the separation of hydrogen and oxygen or their combination.

It is important for the proper functioning of the electrochemical cell 12 to have electrochemically conductive medium 28 sandwiched tightly between active area 22 of anode cavity 10 and active area 23 to facilitate the interaction of fluid and charge in the cavities. In the past, manufacturers have used a pressure pad 36 to bias the active areas of the anode cavity and the cathode cavity 14 together. Pressure pad 36 is positioned within a frame 40 that ensures the position of pressure pad 36 relative to the active areas 22, 23 of plates 18. The pressure pad 36 is made of rubber with strips of metal to make the pressure pad 36 conductive. However, due to the incompatibility of rubber with fluids used in the electrochemical cell, such as hydrogen and oxygen, manufacturers have been forced to isolate the pressure pad 36 from the fluid in the anode cavity 10 and the cathode cavity 14. A barrier, such as a separator plate 32, is typically used to prevent fluid from anode cavity 10 and cathode cavity 14 from passing to pressure pad 36.

There is generally a pressure difference across the electrochemically conductive medium 28 that arises as a consequence of the different pressures of anode cavity 10 and cathode cavity 14. Due to this difference in pressure, pressure pad 36 must provide an initial preload of pressure in the direction of arrow A to ensure that cathode cavity 14 and anode cavity 10 stay together. Without such a preload, cathode cavity 14 will tend to separate from anode cavity 10. In addition, further preload in the direction of arrow A is required to keep the cavities in close contact. As pressure differentials between the anode cavity 10 and the cathode cavity 14 increase, greater preload in the direction of arrow A of pressure pad 36 is required. This increasing preload puts undue stress on the electrochemically conductive medium 28, which is, in fact, the weakest component of the assembly.

A need therefore exists for an assembly that overcomes the deficiencies of existing pressure pads while still ensuring that the active areas of the anode cavity and the cathode cavity stay together.

SUMMARY OF THE INVENTION

The present invention eliminates the need for a pressure pad entirely. Rather than use a pressure pad, the invention uses a spring as a resilient member to force the active areas of the anode cavity and the cathode cavity together. The spring is compatible with the fluids exchanged between the anode cavity and the cathode cavity. Consequently, the separator plate between the cavities and the pressure pad may be eliminated. By eliminating the separator plate, the spring need not be preloaded to accommodate for the pressure differential between the anode cavity and the cathode cavity. The spring will be at pressure equilibrium with pressure within the cavities since it does not block flow of fluid. Therefore, the spring need only provide sufficient preload to bias the anode cavity and the cathode cavity together. This preload is significantly smaller than the preload required for device using a pressure pad.

In addition, the elastic qualities of a spring are well known. Current pressure pads are difficult to analyze and manufacture. Accordingly, accurate and consistent spring rates are difficult to achieve. In contrast, a spring may be designed to have a specific load with a specific deflection. Therefore, it is much easier to control the preload pressure from a spring than from a pressure pad.

One aspect of the invention accordingly comprises a cell structure having a resilient member disposed in a fluid chamber, which is open to receive fluid from either the anode cavity or the cathode cavity. The cell structure may include an anode cavity and a cathode cavity. At least one of the cavities may be in fluid communication with the fluid chamber. The resilient member urges the anode cavity and the cathode cavity together. Both of these cavities may sandwich an electrically chemically conductive medium.

The resilient member may be a spring, such as a wave spring. The wave spring may be characterized by peaks and valleys. Moreover, more than one wave spring may be employed. One wave spring may be concentric with another wave spring. The resilient members may also be electrically conductive.

The wave spring has a preload to urge the active area of the cathode cavity towards the active area of the anode cavity or, alternatively, to urge the active area of the anode cavity towards the active area of the cathode cavity. More than one resilient member may be used to accomplish this objective. One resilient member may push from one direction while a second resilient member may push from an opposite direction to hold the cavities together.

An essential component to this electrochemical cell structure is the spring. The spring is positioned relative to the anode cavity and the cathode cavity by a spring frame. The spring frame may have an opening to permit fluid through the spring frame so that no pressure is built up within the confines of the frame. The spring frame may have members extending in a radial fashion from a center of the spring frame. Portions of the spring may rest between these members.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2 illustrates the inventive electrochemical cell.

DETAILED DESCRIPTION OF THE PREFERRED EMBODIMENT

Figure 1:
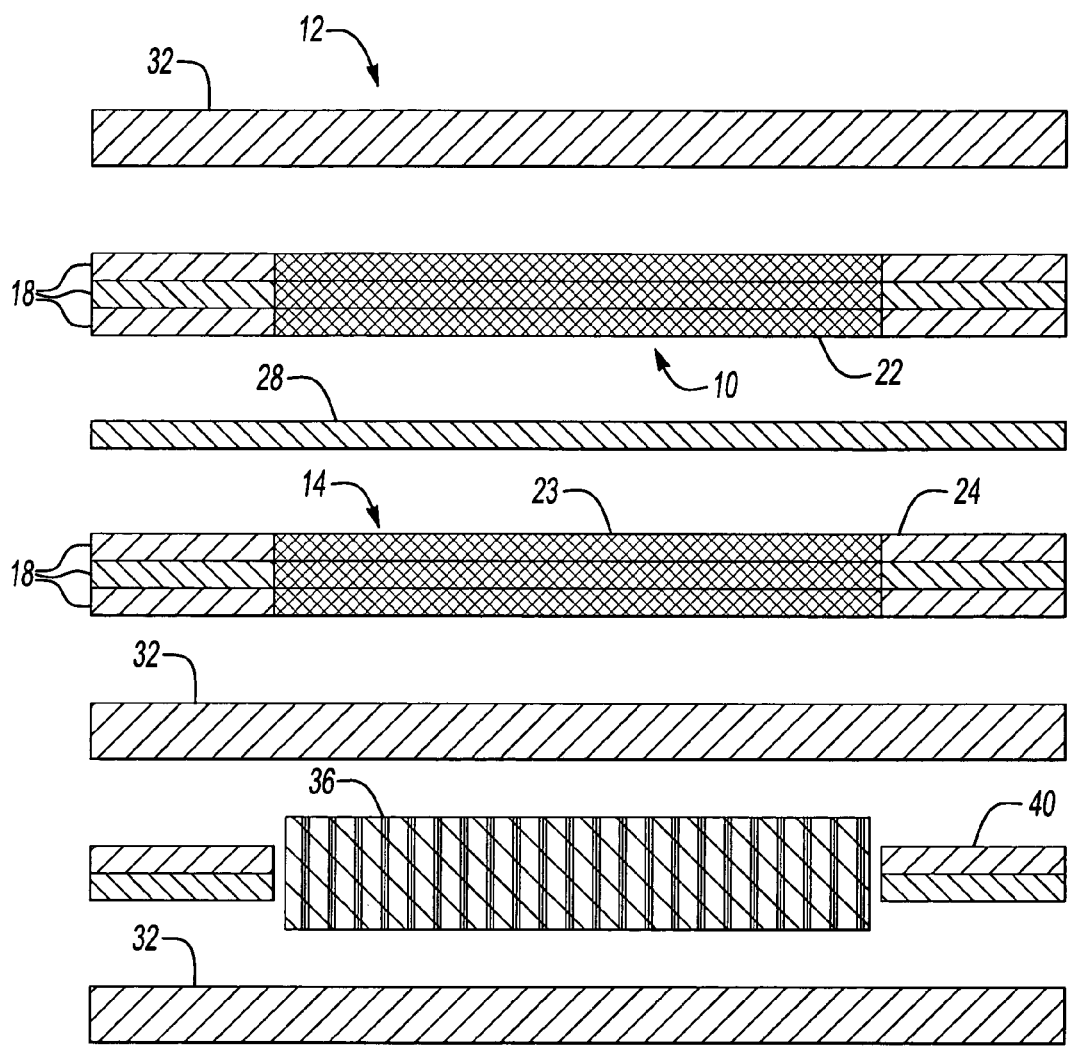
FIG. 1 illustrates a known electrochemical cell.
Figure 1:

FIG. 2 illustrates an exploded view of inventive electrochemical cell structure 50, here an electrochemical cell. Electrochemical cell structure 50 may comprise anode cavity 10 and cathode cavity 14 sandwiched between separator plates 32. Like the prior art, anode cavity 10 and cathode cavity 14 comprise plates having mesh screens with openings forming an active area 22 for anode cavity 10 and an active area 23 for cathode cavity 14. Inactive area 24 of anode cavity 10 and cathode cavity 14 form a fluid barrier to contain fluid within active area 22 and active area 23. Anode cavity 10 and cathode cavity 14 sandwich electrochemically conductive medium 28, such as an ion-exchange membrane or liquid contained in a porous matrix. In contrast to known assemblies, electrochemical cell structure 50 has a spring, resilient member 58 to bias cathode cavity 14 towards anode cavity 10 in the direction of arrow A. In the example shown, resilient member 58 is a wave spring characterized by first peak 66 spaced across valley 74 from second peak 70. Alternatively, resilient member 58 may be located between separator plate 32 and anode cavity 10 to bias anode cavity 10 towards cathode cavity 14.

In addition, as shown in FIG. 2, resilient member 58 is disposed within first fluid chamber 54, which itself is in fluid communication through opening 62 with cathode cavity 14 and anode cavity 10. As shown, there is no separator plate between cathode cavity 14 and fluid chamber 54 blocking fluid flow. As a consequence, resilient member 58 need not be biased to accommodate for any pressure differential between anode cavity 10 and cathode cavity 14. Instead, resilient member 58 need only have sufficient preload in the direction of arrow A to ensure anode cavity 10 and cathode cavity 14 remain in contact with electrochemically conductive medium 28. This preload is significantly smaller than preloads required of pressure pads. This decreased preload allows electrochemical medium 28 to operate at higher differential pressure and minimized load on the cell stack.

Because resilient member 58 is in fluid communication with cathode cavity 14 and anode cavity 10, it is important that resilient member 58 be compatible with the fluids exchanged in anode cavity 10 and cathode cavity 14. For instance, for a hydrogen and oxygen interaction, resilient member may comprise 316 L stainless steel. It is also preferable for resilient member 58 to be electrically conductive so that charge from the electrochemical interaction may be communicated to separator plate 32. As known, separator plate 32 may be in electrical contact with other electrochemical cells.

Figure 3:
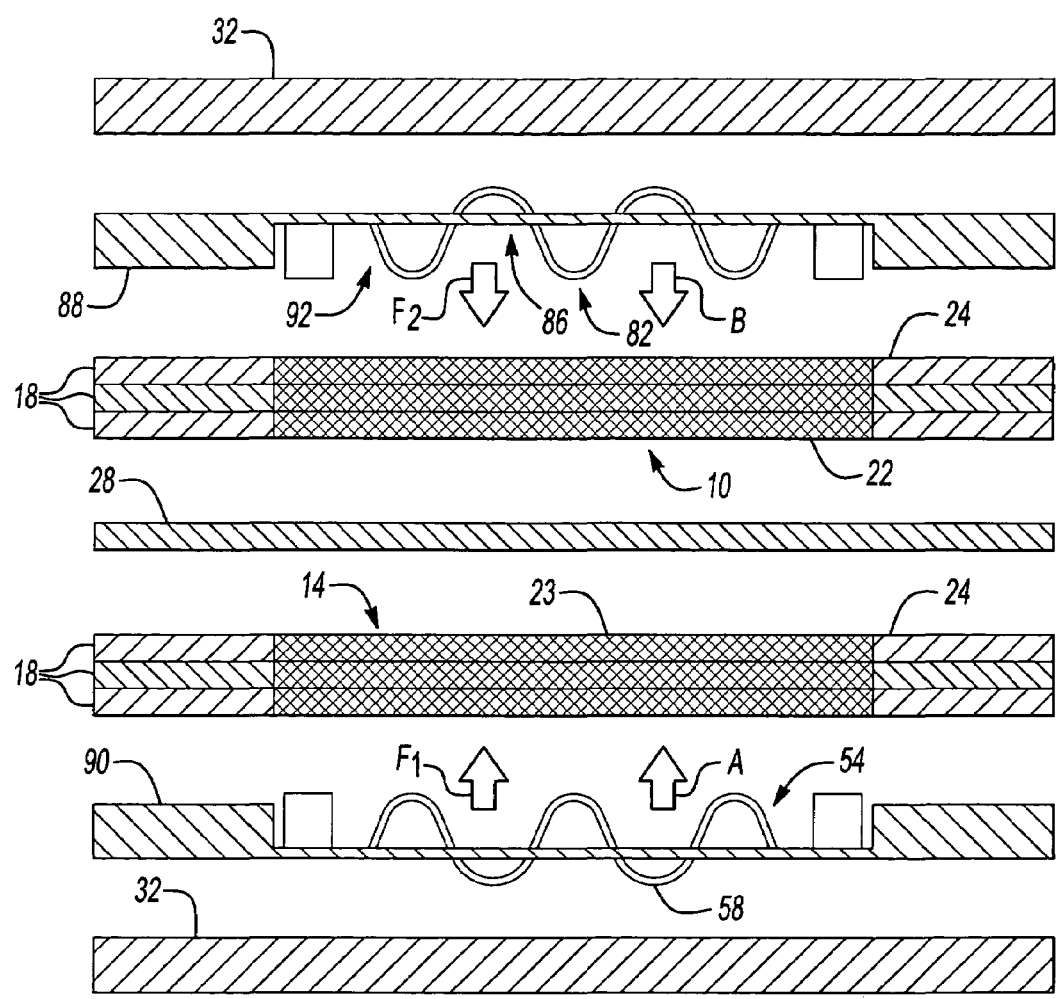
FIG. 3 illustrates another design using the concept shown in FIG. 1.

FIG. 3 illustrates an alternative design. In this design, in addition to resilient member 58, second resilient member 82 is used to keep anode cavity 10 together with cathode cavity 14. Second resilient member 82, also a wave spring, is disposed in second fluid chamber 86, which is also open to fluid from or in fluid communication with anode cavity 10 and cathode cavity 14. Here, resilient member 58 is preloaded as explained before in the direction of arrow A to provide a force $F_1$ so that cathode cavity 14 is pressed towards anode cavity 10. Also, second resilient member 82 is preloaded in the direction of arrow B, a direction opposite to arrow A, to provide force $F_2$ so that anode cavity 10 is pressed toward cathode cavity 14.

Figure 4:
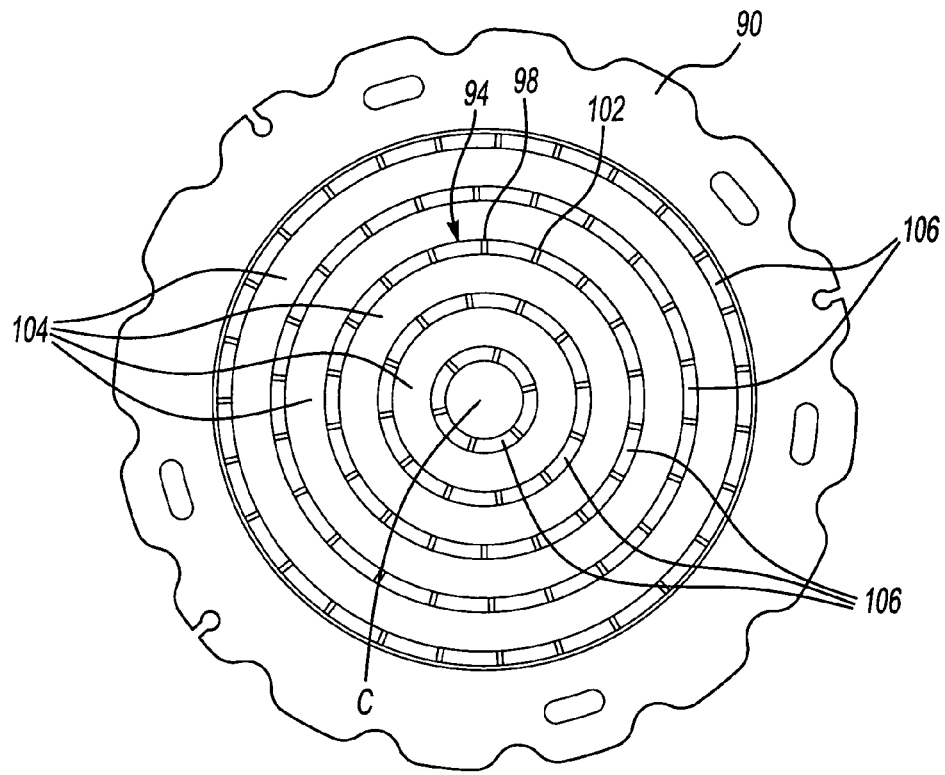
FIG. 4 illustrates a spring frame.
Figure 5:
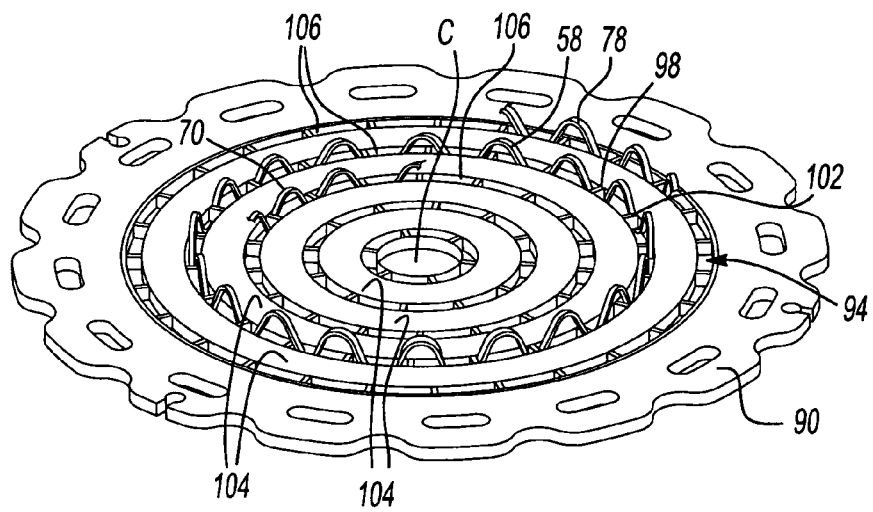
FIG. 5 illustrates the spring frame of FIG. 4 with springs.

FIGS. 4 and 5 illustrate spring frame 90. Spring frame 90 serves to position resilient member 58 relative to active area 22 and 23 so that preload from spring 58 in the direction of arrow A is directed to keep these areas together. Second spring frame 88 at FIG. 3 is also used to position second resilient member 82 relative to the active areas 22 and 23 of the cavities. As shown in FIG. 4, spring frame 90 comprises a cylindrical metallic plate, which may be electrically conductive. Spring frame 90 has lands 104 and channels 106. Channels 106 are designed to receive resilient member 58, a wave spring, in each channel 106.

As shown in FIG. 5, multiple wave springs, such as first wave spring 58 and second wave spring 70, may be disposed within spring frame 90 in concentric fashion in each channel 106. Each channel 106 is separated by a land 104 so that each spring may maintain its position relative to each other within spring frame 90. As further shown in FIGS. 4 and 5, each channel 106 is characterized by members, such as first member 98 and second member 102, which extend radially from center C to form spring frame opening 94. In this way, the peaks of wave spring 58 may rest on members 94 and 98 while the valley 74 may fit within opening 94. This particular design also prevents wave spring 58 from rotating about center C as well as shifting relative to the center.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An electrochemical cell structure comprising:
    a first fluid chamber;
    a resilient member comprising an uncoiled wave spring disposed in said first fluid chamber, wherein said uncoiled wave spring is metallic and comprises a first peak, a second peak and a valley spaced between said first peak and said second peak;
    an opening for permitting communication of a fluid into said first fluid chamber from one of an anode cavity and a cathode cavity; and
    a second uncoiled wave spring located concentrically with said uncoiled wave spring.

2. The electrochemical cell of claim 1 wherein said resilient member is electrically conductive.

3. The electrochemical cell of claim 1 including a second resilient member positioned within a second fluid chamber, said second fluid chamber in fluid communication with said one of an anode cavity and a cathode cavity and said first resilient member in fluid communication with the other of said one of an anode cavity and a cathode cavity.

4. The electrochemical cell of claim 3 wherein said first resilient member is biased to apply a first spring force in a first direction and said second resilient member is biased to apply a second spring force in a second direction opposite to said first direction.

5. An electrochemical cell structure comprising:
a spring; and
a spring frame for positioning said spring relative to an electrochemical cavity wherein said spring frame has a side facing toward said electrochemical cavity and another side facing away from said electrochemical cavity and at least one spring frame opening that extends between said sides for receiving said spring and permitting fluid flow between said sides, wherein said spring frame opening comprises a plurality of ribs.

6. The electrochemical cell of claim 5 wherein each of said plurality of ribs extends generally radially from a center of said spring frame.

7. The electrochemical cell of claim 5 wherein said spring comprises a wave spring having a first peak, a second peak and a valley spaced between said first peak and said second peak.

8. The electrochemical cell of claim 5 wherein said spring comprises a first circular spring and a second circular spring, said first circular spring generally concentric with said second circular spring.

9. The electrochemical cell of claim 5 wherein said spring and said spring frame are electrically conductive.

10. The electrochemical cell of claim 5 further comprising a separator plate adjacent said spring frame and moveable relative to said spring frame.

11. An electrochemical cell structure comprising:
a spring; and
a spring frame for positioning said spring relative to an electrochemical cavity wherein said spring frame has a side facing toward said electrochemical cavity and another side facing away from said electrochemical cavity and at least one spring frame opening that extends between said sides for receiving said spring and permitting fluid flow between said sides, wherein said at least one spring frame opening comprises an annular channel and said annular channel comprises a plurality of ribs spaced circumferentially within said annular channel.

12. The electrochemical cell of claim 11 wherein said spring is interlaced among said plurality of ribs such that said spring passes alternately over and under said plurality of ribs to resist circumferential movement of said spring relative to said spring frame.

13. An electrochemical cell structure comprising:
a first fluid chamber;
a resilient member comprising an uncoiled wave spring disposed in said first fluid chamber, wherein said uncoiled wave spring is metallic and comprises a first peak, a second peak and a valley spaced between said first peak and said second peak, and wherein said uncoiled wave spring is an annular structure, and the first peak, the second peak, and the valley extend out of a plane of the annular structure;
an opening for permitting communication of a fluid into said first fluid chamber from one of an anode cavity and a cathode cavity.

* * * * *